United States Patent

Carlstrom et al.

[11] Patent Number: 5,222,543
[45] Date of Patent: Jun. 29, 1993

[54] MICROWAVE CURING

[75] Inventors: Bengt I. Carlstrom, Klagenfurt; Barry G. Seach, Carlingford; Joseph Sanegor, Allawah; Geoffrey E. Beard; Warwick R. Belcher, both of North Epping, all of Austria

[73] Assignee: James Hardy & Coy. Pty. Limited, New South Wales, Australia

[21] Appl. No.: 725,874

[22] Filed: Jun. 28, 1991

Related U.S. Application Data

[63] Continuation of Ser. No. 428,352, Oct. 27, 1989, abandoned.

[30] Foreign Application Priority Data

Oct. 28, 1988 [AU] Australia ................... PJ1212

[51] Int. Cl.$^5$ ................. B22D 13/00; B22D 27/02
[52] U.S. Cl. .............................. 164/114; 164/48; 164/250.1; 164/298; 425/435; 425/174.4; 264/311; 264/25
[58] Field of Search ............. 164/114, 48, 492, 250.1, 164/286, 298, DIG. 3; 425/174.4, 435; 264/311, 25, 26

[56] References Cited

U.S. PATENT DOCUMENTS

| | | | |
|---|---|---|---|
| 2,817,734 | 12/1957 | Levy | 200/142 |
| 3,732,048 | 5/1973 | Guerga et al. | 164/492 |
| 4,173,608 | 11/1979 | Soulier | 264/26 |
| 4,298,324 | 11/1981 | Soulier | 425/174.8 |
| 4,468,184 | 8/1984 | Rawlings et al. | 264/311 |
| 4,568,501 | 2/1986 | Wichterle et al. | 264/311 |
| 4,570,698 | 2/1986 | Kouberg | 164/114 |
| 4,590,018 | 5/1986 | Neefe et al. | 264/311 |
| 4,726,828 | 2/1988 | Clasen | 65/18.1 |
| 4,765,066 | 8/1988 | Yoon | 34/1 |
| 4,880,578 | 11/1989 | Holcombe et al. | 264/25 |

FOREIGN PATENT DOCUMENTS 2053592 4/1971 France.

OTHER PUBLICATIONS

Cheng, David K., *Field and Wave Electromagnetics*, Addison Wesley Publishing Company, 1983, chap. 10, §10-2.1, p. 448.

*Reference Data for Radio Engineers*, Howard Sams & Co., Inc., 1981, 6th ed., chap. 25, p. 25-1.

Ramo, Simon, et al., *Fields and Waves in Communication Electronics*, John Wiley & Sons, Inc., 1965, §7.17, pp. 415-419.

Primary Examiner—Mark Rosenbaum
Assistant Examiner—Rex E. Pelto
Attorney, Agent, or Firm—Weingarten, Schurgin, Gagnebin & Hayes

[57] ABSTRACT

An apparatus for centrifugal casting of hollow articles in particular pipes. The apparatus has an elongate generally cylindrical hollow mould with a center conductor extending along the longitudinal axis so that the combination acts as a coaxial waveguide. A microwave source and waveguide system are provided to direct substantially TEM mode radiation into one end of the mould. The mould and center conductor are terminated at the other end by a short circuit to microwave radiation so that standing waves are established in the mould. The invention also provides a method for centrifugal casting of such articles in which a casting composition is placed in a hollow rotating mould and microwave radiation is directed into the mould to heat the casting composition.

19 Claims, 5 Drawing Sheets

MICROWAVE CURING

This application is a continuation of application Ser. No. 07/428,352 filed Oct. 27, 1989 now abandoned.

BACKGROUND OF THE INVENTION

1. Field of the Invention

This invention relates to centrifugal casting of pipes. Although the method and apparatus of this invention will hereinafter be described primarily with reference to the manufacture of centrifugally cast glass filament reinforced pipes the invention is also applicable to other types of centrifugally cast pipes and other centrifugally cast articles.

2. Description of the Prior Art

In the known centrifugal casting process for glass reinforced plastic pipes, liquid resin and hardening agent are placed inside a rotating cylindrical mould along wit the required reinforcements and fillers in the appropriate order and amounts. The centrifugal force created by the rotation causes the solid materials to migrate through the liquid resin to the outer wall and compact in the normal way. The glass filaments usually take several minutes to compact fully due to the high viscosity of the liquid resin and the large specific surface area of the glass filaments. After an appropriate delay, heat is applied to the pipe either by blowing heated air along the bore of the uncured pipe or by applying heat to the outside of the mould through an appropriate medium such as heated air, oil or water. The heating accelerates the triggering of the curing of the resin and hardener. In either case, the heat is conducted through the surface of the pipe and must spread through the rest of the pipe wall by conduction. This is a slow process as most plastics are poor thermal conductors. These processes also often result in uneven heating of the pipe resulting in some parts of the pipe curing more slowly than other.

SUMMARY OF THE INVENTION

It is an object of this invention to provide a centrifugal casting apparatus, and a method of centrifugal casting, which will overcome or at least ameliorate the above disadvantages.

Accordingly, in one aspect this invention consists in an apparatus for centrifugal casting of hollow articles comprising a hollow rotatable mould, means to generate microwave radiation and transmission means to direct said microwave radiation into the mould whilst the mould is rotating to heat casting material disposed therein.

In a second aspect this invention consists in a method for centrifugal casting of hollow articles comprising the steps of placing a casting composition in a hollow rotating mould and directing microwave radiation into said rotating mould to heat the casting material.

Preferably the microwave radiation is generated by a substantially conventional magnetron and directed to the mould by a waveguide system. The waveguide system preferably includes a circulator and water load, together with a directional coupler fitted with power level detectors arranged to detect the power levels propagating in the forward and reverse directions. A means of tuning the section of the microwave transmission system containing the casting materials so as to apply a suitable level of power to the material is preferably also included.

It is preferred that the waveguide system is coupled to the mould by means of a doubly-choked rotary joint surrounded by a secondary labyrinth radiation seal for RFI (radio frequency interference) minimisation purposes. A stationary short circuit termination is preferably provided at the end of the mould remote from the end coupled with the waveguide transmission system. The stationary termination is also preferably coupled with the mould by means of a double-choked rotary joint surrounded with a secondary labyrinth radiation seal for RFI minimisation purposes.

A centre conductor preferably extends along the length of the mould and into the waveguide system. In use the centre conductor preferably joins electrically with the stationary short circuit termination by means of a non-contacting, doubly choked, axial joint.

The microwave generator, waveguide system and centre conductor are preferably mounted on a moveable carriage so that the can be readily moved into position when required, but otherwise do not interfere with the mould operations. The stationary short circuit termination is also preferably mounted on a similar carriage.

In use the microwave energy is used to heat the casting material to at least accelerate curing. This provides a number of advantages over conventional centrifugal casting including:

(i) The microwave energy heats the uncured pipe wall material directly throughout the thickness of the material.
(ii) The rate of heating can be readily controlled.
(iii) The amount of energy and hence heat applied can be easily measured as it is applied which allows more accurate control.
(iv) Because the microwave energy heats the casting material directly it is inherently more thermally efficient than prior art indirect heating method.
(v) The loss tangent of liquid resin is significantly higher than that of cured resin. This property ensures that the microwave energy tends to dissipate preferentially in uncured resin rather than in resin already triggered. This property can be utilised to assist in obtaining relatively uniform microwave energy absorption within any pipe wall material during manufacture utilising microwave energy.

The above factors (ii) and (iii) allow the timing of the curing reaction to be accurately controlled. Together with factor (v), these result in improved consistency in product properties.

The invention is applicable to any centrifugally cast articles requiring heat to initiate or perform curing including but not limited to articles made form polyester resins, vinylester resins, bis-phenol A resins and epoxy resins.

Some embodiments of this invention will now be described, by way of example only, with reference to the accompanying drawings.

DESCRIPTION OF THE PREFERRED EMBODIMENTS

Figure 1:
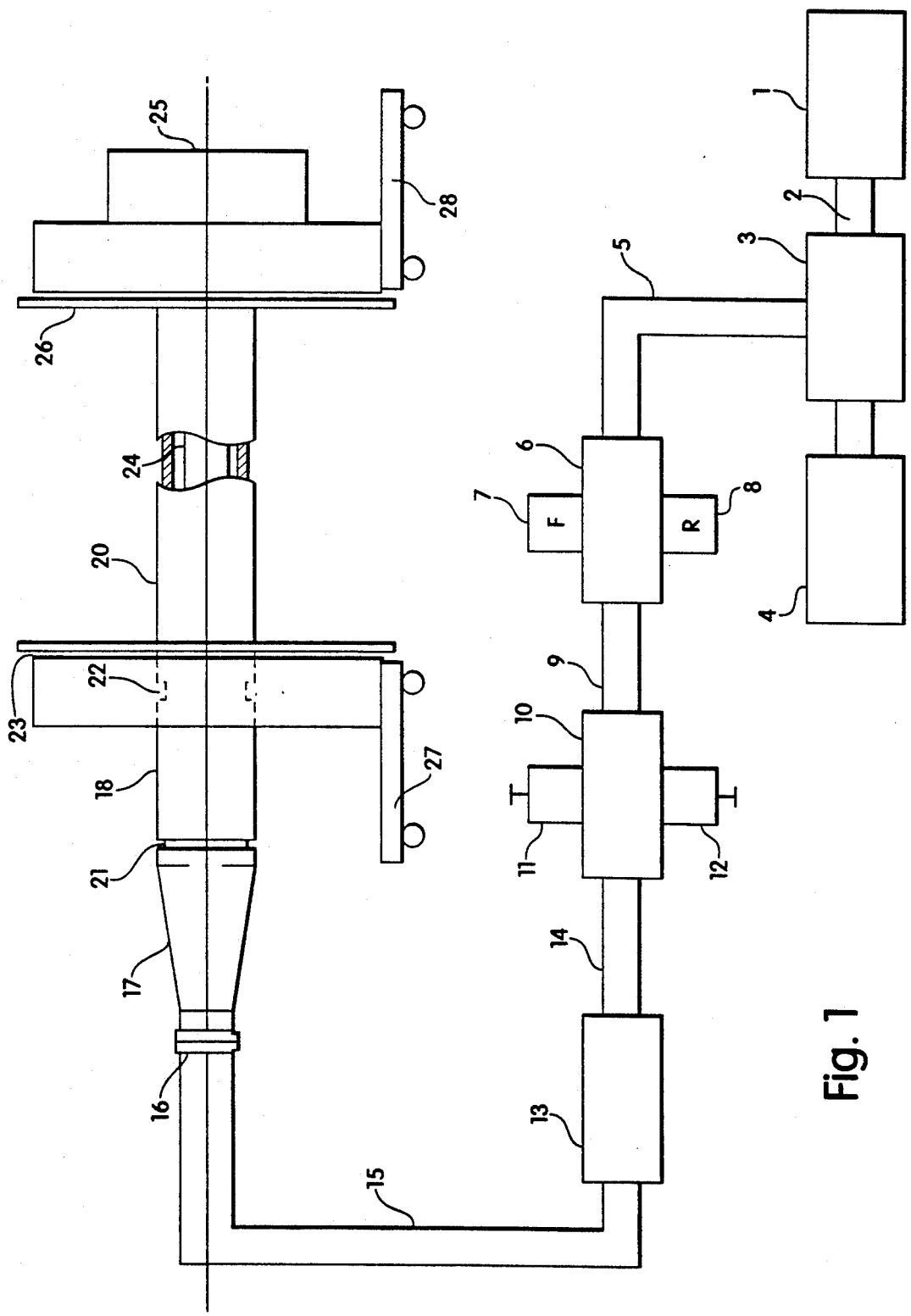
FIG. 1 schematically shows the major components of an apparatus for centrifugal casting of pipes according to this invention.

Referring firstly to FIG. 1 the apparatus for centrifugal casting according to this invention comprises microwave generator 1 which takes the form of a substantially conventional magnetron and launcher (not shown). Generator 1 produces microwave energy in the 915 MHz band in the $TE_{10}$ mode which is launched into a section 2 of a WG4 waveguide for propagation to the input port of a suitable WG4 circulator 3 with a WG4 water load 4 connected to the return loss port. The microwave radiation propagates from the incident port of the WG4 circulator through a WG4 waveguide section 5 to a WG4 high-power directional coupler 6, fitted with power level detectors 7 and 8 arranged to detect the power levels propagating in the forward and reverse directions respectively. The WG4 directional coupler 6 is connected to further waveguide 9 which allows microwave radiation to propagate to a WG4 magic-tee tuner 10. Tuner 10 is fitted with two adjustable WG4 waveguide short circuit terminations 11 and 12 which enable tuning of the succeeding waveguide structure to or near resonance at 915 MHz.

The magic-tee tuner 10 is connected via waveguide 14 to a WG4 co-axial mode transducer 13 which changes the mode of propagation of the radiation in the succeeding waveguide transmission cavity form the $TE_{10}$ mode to the TEM mode. The microwave radiation within the co-axial portion of the mode transducer 13 will exist in TEM mode and other higher-order co-axial waveguide modes. The energy propagating from the mode transducer 13 will be predominantly in TEM mode. Mode purity is maintained by causing the radiation to propagate through a section of slowly-tapering co-axial line 15 in which the co-axial centre conductor (not shown) tapers slowly and in which the cross-sectional dimensions are small enough to inhibit propagation of any higher-order co-axial waveguide modes generated within the mode transducer 13. That is, the slowly tapering co-axial line 15 acts as a mode fitter.

The tapered co-axial line 15 is connected to a tapered co-axial line 17, in which both co-axial outer and inner conductors taper in diameter, via a flanged joint 16. The section of line 17 is included to permit both inner and outer conductors to taper to diameters compatible with the input cross-sectional diameters of a transitional tapered waveguide 18 used to coupled to the waveguide system to a rotating mould 20. The taper in the co-axial line 17 is slow enough to ensure only minimal higher-order mode generation once cross-sectional dimensions reach a size where higher-order modes are above cut-off and their propagation within the structure is therefore possible. The tapered waveguide 18 is longitudinally split as shown at 19 and 19a in FIGS. 3a and 3b so as to be easily removed and replaced to provide a transitionally coupling to moulds of differing sizes. In some applications line section 17 can also be longitudinally split for ease of replacement.

The tapered waveguide 18 is coupled to the tapered line section 17 by a double-choked non-contacting rotary joint 21 and the rotating mould 20 via a further double-choked non-contacting rotary joint 22 and a surrounding labyrinth radiation seal shown at 23. In use tapered waveguide 18 remains stationary and rotating joint 21, described in detail below, is used as a means of providing a simple effective coupling which enables easy removal of the tapered waveguide 18 without the conduction problems associated with contacting waveguide joints.

The labyrinth radiation seal 23 ensures that any microwave energy radiated to the surrounding environment form the rotary joint 22 and surrounding labyrinth seal 23 is at an extremely low intensity.

A centre conductor 24 of the co-axial feeding structure extends into the rotating mould 20 to form a further co-axial structure consisting of the centre conductor 24 and rotating mould 20. At the end of the mould remote from the microwave feed, both the mould 20 and co-axial centre conductor 24 are connected to a universal, multiple, short circuiting structure 25. The centre conductor 24 is coupled to the short circuit 25 by a non-contacting, doubly-choked, axial joint shown in detail in FIGS. 5a and 5b. The rotating mould 20 is coupled to the short circuit 25 by a further non-contacting, double-choked rotary joint shown in FIGS. 5a and 5b. Surrounding the universal multiple short circuiting structure 25 is a second non-contacting, labyrinth radiation seal indicated at 26 and shown in detail in FIGS. 5a and 5b. Again this seal ensures that minimal microwave energy is radiated to the surrounding environment from the rotary joint. The universal multiple short circuiting structure 25, described in detail below, effectively provides an electrical short circuiting of the casting mould 20 to the co-axial centre conductor 24 at the operating frequency of 915 MHz. In this way complete reflection of the microwave radiation is achieved so as to produce standing waves within the mould 20.

Figure 2:
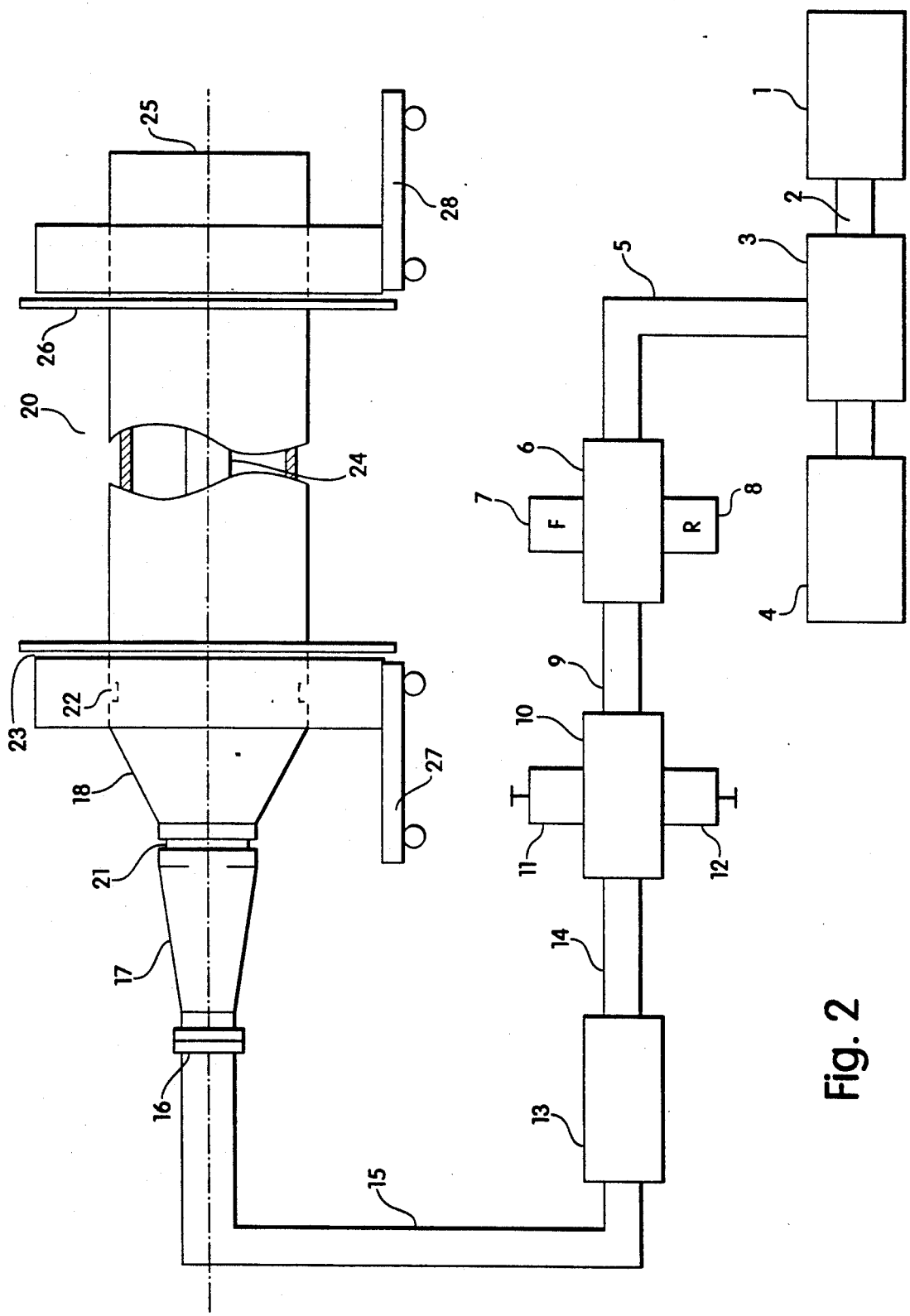
FIG. 2 schematically shows an apparatus similar to that shown in FIG. 1 modified for use with a mould for making larger diameter pipes.

FIG. 2 shows an arrangement similar to FIG. 1 and the same reference numerals have been used to identify the corresponding parts of the arrangement. In the arrangement of FIG. 2 however the mould 20 has a somewhat larger diameter and the transitional waveguide 18 has a considerably greater taper to accommodate the change in diameter from tapered line 17 to the mould 20. This modification requires only a change in the transitional waveguide 18 which, as described above, is longitudinally split for ease for removal.

In both FIGS. 1 and 2 the generator 1, and the whole of the ensuing waveguide system up to and including transitional waveguide 18 and centre conductor 24 are mounted on a moveable carriage schematically at 27. This allows movement of the microwave system in a direction parallel to the axis of mould 20 so that the system can be displaced from the mould when not required as will be described below. Similarly, short circuit 25 is mounted on a moveable carriage schematically shown at 28 for movement in a direction parallel to the axis of mould 20.

Figure 3A:
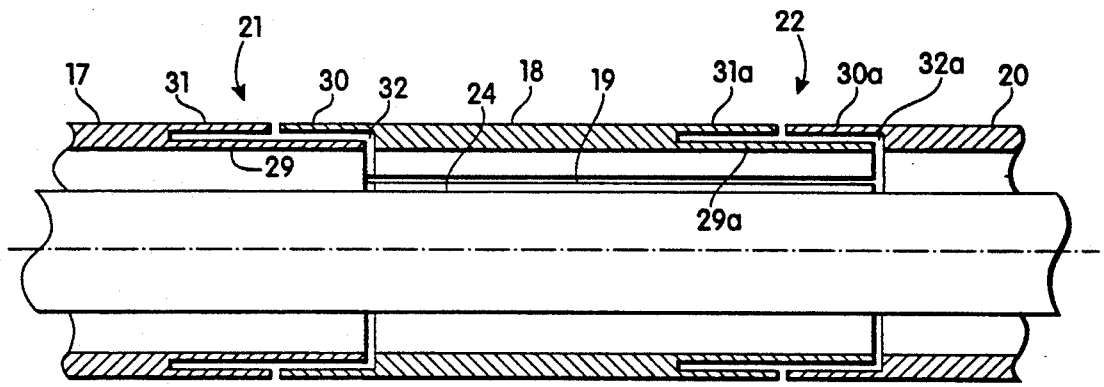
FIGS. 3a and 3b respectively show schematically two somewhat simplified examples of non-contacting transition waveguide sections forming part of this invention.

FIG. 3a is an enlarged and simplified view of part of FIG. 1 showing the transitional waveguide 18 and non contacting joint 21 and non-contacting rotary joint 22 in greater detail without the surrounding labyrinth radiation seal 23. As will be seen from the drawing the double-choked rotary joint 21 comprises an inner spigot 29 extending from coaxial line 17 into a cylindrical flange 30 extending from tapered coupled 18 and having a length of λ/4 where λ is the wavelength of the microwave radiation in the waveguide. That is, the flange 20 overlaps the spigot 29. A further flange 31 extends circumferentially around spigot 29 for a distance of λ/4 approximately half the length of the spigot. When spigot 29 is nested within flange 30 the ends of flanges 30 and 31 are opposed and closely adjacent. The clearances between the respective surfaces and ends are about 5 mm. In this way a doubly choked non-contacting joint is formed which provides a short circuit to microwave radiation across gap 32 so that the waveguide structure is electrically continuous to the microwave radiation.

Additionally, the joint 21 is formed by the nesting of spigot 29 within flange 30.

The non-contacting rotary joint 22 is identical in form of the joint 21 and the corresponding parts are labelled 29a, 30a, 31a and 32a. Unlike joint 21 however, the parts of the joint associated with mould 20 rotate with the mould whilst the parts of the joint associated with transitional waveguide 18 remain stationary. The joint to be readily disassembled by drawing tapered line 17 and transitional waveguide 18 remain stationary. The joint to be readily disassembled by drawing tapered line 17 and transitional waveguide 18 away from mould 20 in a direction parallel to their longitudinal axes which are coincident with the longitudinal axis of mould 20. This facilitates easy separation of the waveguide system from the rotation mould.

Figure 3B:
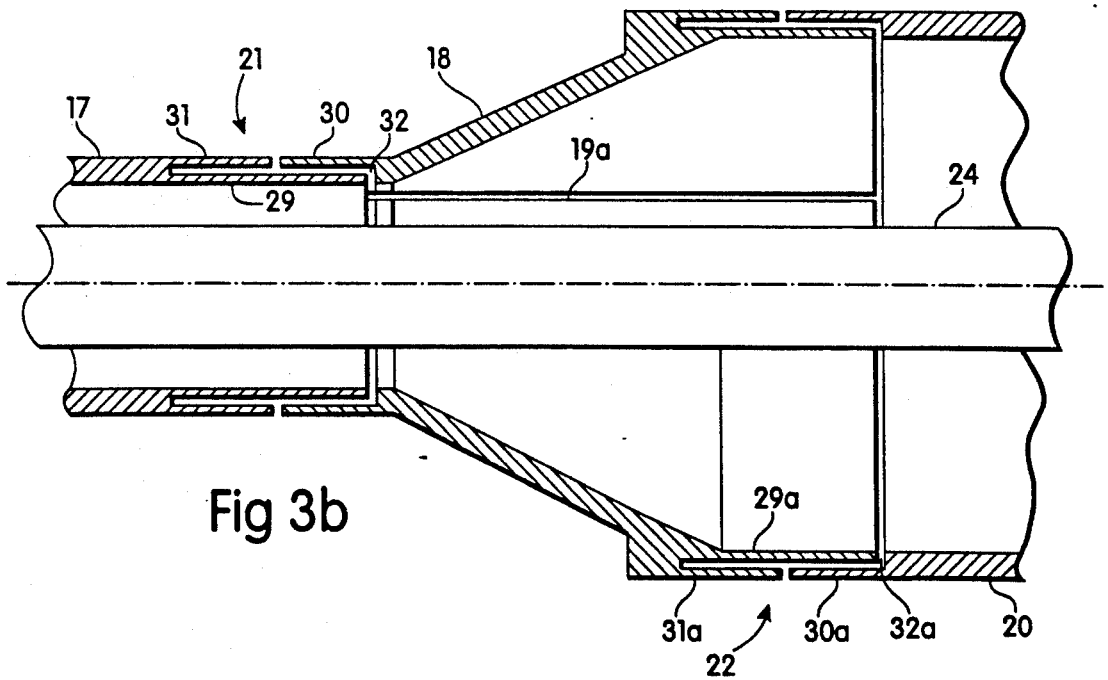

FIG. 3b provides the same view as FIG. 3a in relation to FIG. 2. The only difference in this arrangement is that the transitional tapered waveguide 18 has a greater taper to conform with the increased diameter of mould 20. Again corresponding parts are indicated by the same reference numerals. The joint 21 and rotary joint 22 are identical to those described in relation to FIG. 3a.

Figure 4:
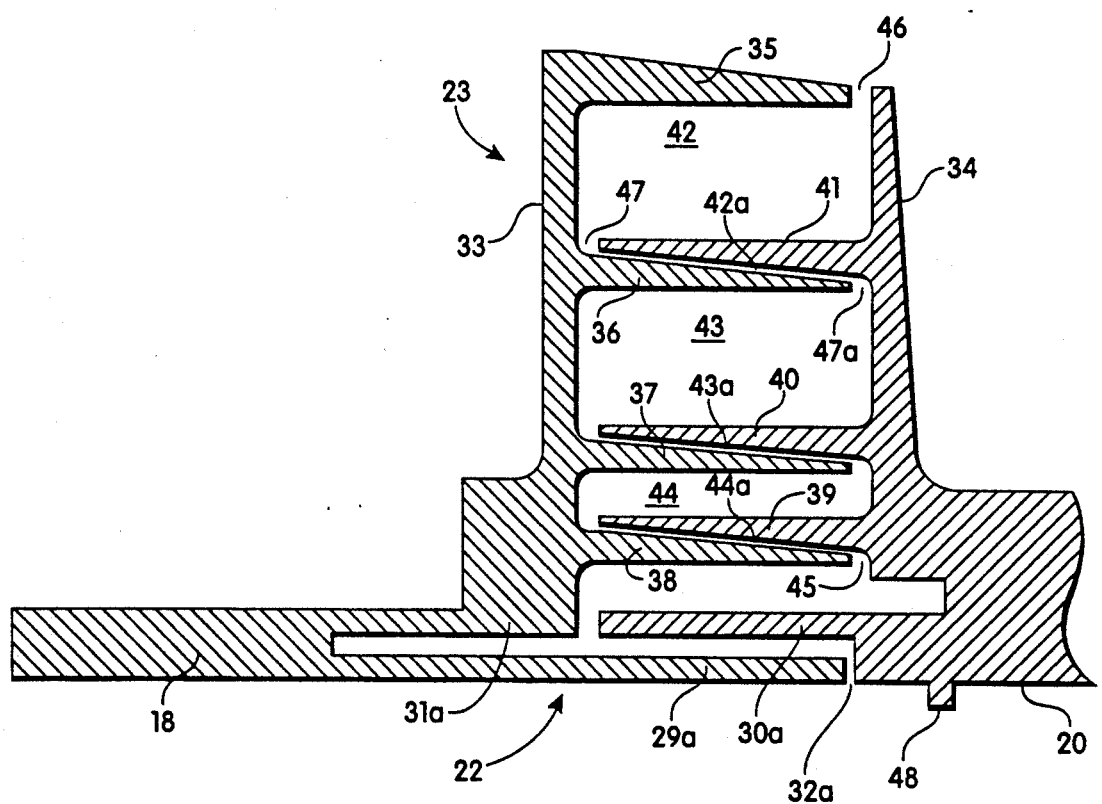
FIG. 4 schematically shows a sectioned view of a non-contacting secondary radiation seal forming part of this invention.

FIG. 4 shows an enlarged sectional view of the rotary joint 22 and surrounding secondary labyrinth radiation seals 23. The radiation seals 23 and 26 are identical in form and only seal 23 will be described in detail. The seal 23 consists of two interengaging portions 33 and 34 respectively forming part of transitional tapered waveguide 18 and mould 20. Formation 33 has four cylindrical flanges 35, 36, 37, 38 concentrically arranged with the longitudinal axis of the mould 20. Formation 34 has three similar cylindrical flanges 39, 40, 41 concentrically arranged with respect to the longitudinal axis of mould 20 and extending in an opposing direction to the flanges 35, 36, 37, 38. The flanges are arranged such that six sections of co-axial transmission line 42, 42a, 43, 43a, 44, 44a are formed which connect electrically in cascade. Outermost co-axial line section 42 is formed between outermost flange 35 and closely adjacent flange 41. The next co-axial lie section 42a is formed between flanges 41 and 36. Co-axial line section 43 is formed between flanges 36 and 40, while co-axial line section 43a is formed between flanges 40 and 37. Similarly, co-axial line section 44 is formed between flanges 37 and 39, while co-axial line section 44a is formed between flanges 39 and 38.

Transmission line sections 42, 43 and 44 provide transmission paths of high characteristic impedance relative to the respective characteristic impedances of transmission line sections 42a, 43a and 44a. The arrangement of transmission line sections 42, 42a, 43, 43a, 44, 44a provides a stepwise transformation from the open circuit at the gap 46, between the outermost flange 35 and formation 34, to a near short circuit at the tap 45, between the innermost flange 38 and the formation 34. The transmission line section 42 is dimensioned so that the high impedance at 46 is transformed to a lower impedance at gap 47 between flange 41 and formation 33. The impedance at gap 47 is transformed to an even lower impedance at gap 47a between flange 36 and formation 34. This requires the axial dimension of each transmission line section to be λ/4 where λ is the wavelength of the radiation to be presented with the impedance transformations. Similar impedance transformations are made across each of the remaining pairs of transmission line sections 43, 43a and 44, 44a. The three pairs of transmission line sections 42 and 42a, 43 and 43a, 44 and 44a connected in cascade act as a bandstop filter at the radiation frequency at which the axial dimensions are equal to λ/4. The dimensions of the transmission line sections are selected to provide an effective bandstop filter to all 915 MHz band microwave radiation thus providing an effective radiation seal for the purposes of preventing radio frequency interference and ensuring personnel safety.

An annular dam ring 48 is provided at the end of mould 20 to prevent casting material (not shown) from flowing axially out of the mould and into rotary joint 22.

Figure 5B:
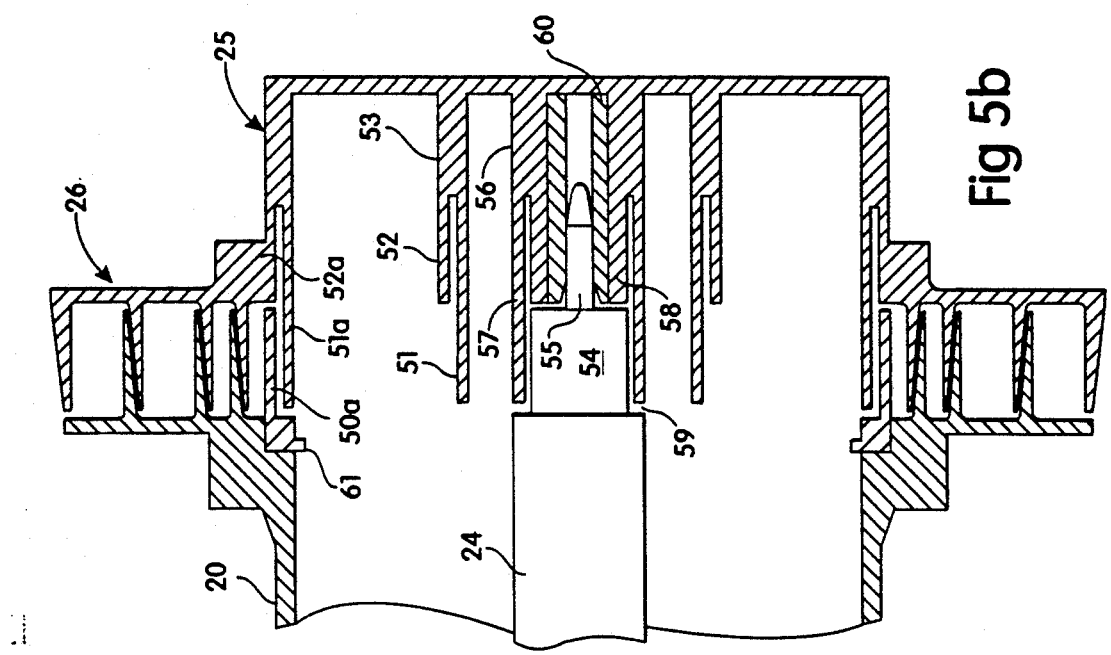
FIGS. 5a and 5b respectively shown schematically two examples of the application of a short circuiting apparatus forming part of this invention.
Figure 5A:
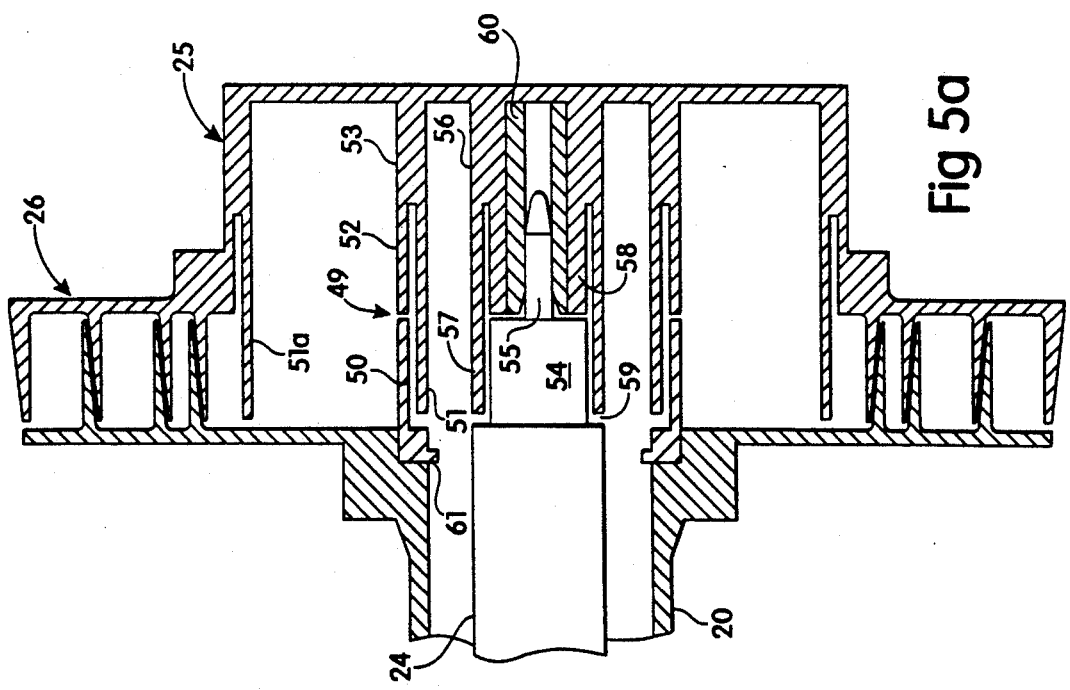

FIG. 5a shows the short circuit device 25 in greater detail. The short circuit device is a universal multiple short circuiting structure in that it can be used with moulds 20 the two different sizes shown in FIGS. 1 and 2 as well as providing the necessary short circuit to both the mould 20 and centre conductor 24. A double-choked rotary joint 49 is provided to couple pipe 20 with short circuiting structure 25. The rotary joint 49 which is identical to the type described above with reference to FIGS. 3a and 3b is formed by a cylindrical flange 50 extending from mould 20, together with a spigot 51 and cylindrical flange 52 extending from a cylindrical formation 53 forming part of short circuit 25. A labyrinth rotary radiation seal 26 of the kind described with reference to FIG. 4 surrounds the rotary joint 49 to minimise radiation leakage.

Centre conductor 24 has at its free end a cylindrical portion 54 of reduced diameter from which a small diameter pin 55 projects. An inner cylindrical formation 56 forming part of short circuit 25 i concentric with the axis rotating mould 20 and hence centre conductor 24. Formation 56 includes a spigot 57 which surrounds narrowed portion 54 of centre conductor 24. Spigot 57 also surrounds a cylindrical projection 58 of the same diameter and in end to end relationship to portion 54 of centre conductor 24. The overlap of spigot 57 with each of portion 54 and projection 58 is λ/4 so that a doubly choked joint is formed and gap 59 between centre conductor 24 and spigot 57 appears electrically continuous to 915 MHz band radiation. Pin 55 has a length of λ/4 so as to provide an open circuit at its end and fits into an insulating bush 60 in formation 56 for alignment purposes. Bush 60 is longer than spigot 55 to minimise field leakage. The end of pin 55 and bush 60 are tapered to facilitate ease of engagement. It will be apparent that all of the rotary seals are formed by intermeshing of parts respectively associated with the mould 20, centre conductor 24 and short circuit 25 so that the short circuit 25 can be withdrawn from engagement with the centre conductor 24 and pipe 20 by movement in a direction parallel to the longitudinal axis of mould 20.

An annular dam ring 61 is provided at the end of mould 20 to prevent casting material (not shown) from flowing axially out of the mould and into the short circuiting device 25.

FIG. 5b is a view similar to FIG. 5a showing the arrangement of the sort circuit in an apparatus of the kind shown in FIG. 2. In this arrangement the mould 20 has a larger diameter and the doubly-choked joint 49 is formed in an identical manner closer to the labyrinth seal 26 by cylindrical flange 50a extending from mould 20, spigot 51a extending from short circuit 25, and flange 52a formed by part of short circuit 25. The presence of the additional cylindrical formation 53 for use with the smaller diameter mould has only a minimal effect on the total field structure and hence introduces only minimal mode generation.

In use, the apparatus of this invention operates as follows. When the building of a pipe according to the known process is completed and the pipe is ready to be cured, the movable carriages 27, 28 are relocated close to the rotating mould 20. The centre conductor 24 is inserted through the rotation mould 20 until it engages with the universal, multiple short circuiting structure 25. When this is done, rotating portions of the labyrinth seals 23, 26 at either end of the mould 20 are engaged with the corresponding non-rotating portions of the labyrinth seals. In the same action the double-choked rotary joints are established. The operating clearances between rotary joints are established. The surfaces of non-contacting, double-choked rotary joints and sets of labyrinth seals are about 5 mm.

When the apparatus has been positioned as described above, the microwave generator 1 is used to send microwave radiation along the waveguide system and into the rotating mould 20. The amount of energy delivered is measured using the power level meters 7 and 8 and is adjusted using a magic tee tuning device 10 with tuning short circuits 11 and 12. The operation of the microwave generator 1 is adjusted using electronic control circuitry of known type associated with the magnetron power supply (not shown). When sufficient energy has bee applied to the pipe material in the rotating mould 20, the microwave generator 1 is turned off and the movable carriages are sued to retract the microwave system from the rotating mould 20.

The use of the TEM mode in applying microwave energy to the pipe casting material has a number of advantages since the presence of co-axial waveguide modes together with the TEM co-axial transmission line mode would introduce deleterious effects. For example:

(a) The guide wavelengths of different propagating modes are in general different. To introduce microwave energy in more than one propagating mode in the transmission structure would have the effect of causing the axial distribution of microwave energy in the transmission structure, especially in the region of the rotating mould, to be uneven, due to constructive and destructive interference between these propagating modes. The net effect would be to produce an axial distribution featuring regions of high and low energy density with resulting regions of high and low energy dissipation within the pipe casting material.

(b) The surface currents associated with the co-axial transmission line (TEM) mode are axial. Interruptions to the integrity of a conducting surface carrying an axial current will only be accompanied by an electrical effect if the interruption is such as to interrupt normal current flow. Accordingly mechanical structures supporting co-axial transmission line modes may be split axially without noticeable electrical effect.

This property has been used in the transitional waveguide 18. Its construction as a split structure enables rapid replacement as required, without the necessity for its removal over the full axial length of the inner conductor, as would be the case with an unsplit structure.

It will be apparent that all surface interruptions, other than the axial splits mentioned in (b) above are disposed at constant axial position with respect to the transmission structure. Each interruption is choked such that electrically the surface appears continuous at 915 MHz. Co-axial surface currents for the TEM mode cross the surface interruption axially. The interrupted surface current magnitude is constant at each point on the interruption. Hence the complete axial and circumferential symmetry of the electrical structure tends to inhibit co-axial waveguide mode generation since co-axial waveguide mode surface currents are not circumferentially constant.

It will also be appreciated that the electric field vector of the co-axial transmission line mode in a symmetrical structure, as presented by the rotating mould 20 and centre conductor 24, is precisely radial. Hence any surface which is co-axial with the axis of the spinning mould 20 and centre conductor 24 will be an equipotential surface. A thin conducting surface placed on an equipotential surface will not interfere with the radial potential distribution of the co-axial structure. This property has been used in the universal, multiple short circuiting structure 25. The presence of the cylinder 53 in the active region of the universal, multiple short circuiting structure when it is used with the larger mould 20 shown in FIG. 5(b) will have minimal effect on the total field structure and hence will introduce minimal mode generation.

Although the foregoing specific description describes the invention with reference to the 915 MHz microwave radiation band it will be appreciated that the invention can be used with microwave energy of any suitable frequency by appropriate modification of the dimensions of the apparatus.

We claim:

1. An apparatus for centrifugal casting of hollow articles, comprising:
    a rotatable mold having a longitudinally extending cavity and a substantially microwave impervious outer wall;
    means, disposed external to said mold, for generating transverse electric and magnetic (TEM) microwave radiation; and
    transmission means comprising a center conductor extending within and along the length of said mold and coupled to said means for generating microwave radiation, for directing said TEM microwave radiation into said mold while the mold is rotating such that said microwave radiation propagates along said longitudinally extending cavity to heat form within said mold a casting material disposed therein.

2. An apparatus as claimed in claim 1 wherein said mould has a substantially open end into which said microwave radiation is directed.

3. An apparatus as claimed in claim 2 wherein said mould is elongate and generally cylindrical with two substantially open ends.

4. An apparatus as claimed in claim 3 wherein said mould acts as a waveguide for the propagation of said microwave radiation.

5. An apparatus as claimed in claim 4 wherein said centre conductor and said mould are terminated at one of said open ends by a short circuit to said microwave radiation so that said radiation is reflected to produce standing waves.

6. An apparatus as claimed in claim 4 wherein said means to generate microwave radiation, said waveguide system and said centre conductor are mounted with a movable carriage adapted to permit selective positioning of the waveguide system in coupled disposition with one end of the mould such that the centre conductor extends internally along the length of the mould.

7. An apparatus as claimed in claim 6 wherein said short circuit is provided by short circuiting structure mounted with a movable carriage for selective movement into operative engagement with the open end of said mould remote from said waveguide system and the free end of said central conductor.

8. An apparatus as claimed in claim 3 wherein said transmission means comprises a waveguide system including a transition waveguide section to couple to an open end of said mould, said open end and said transition section being coupled by a non-contacting rotary joint.

9. An apparatus as claimed in claim 8 wherein said transition waveguide section is split longitudinally to facilitate rapid replacement with a like transition waveguide section to accommodate different size hollow moulds.

10. An apparatus as claimed in claim 8 wherein said rotary joint is a double-choked joint.

11. An apparatus as claimed in claim 10 wherein said rotary joint is formed by a hollow cylindrical spigot overlapped by opposing flanges.

12. An apparatus as claimed in claim 10 wherein said doubly choked rotary joint is surrounded by a secondary labyrinth radiation seal.

13. An apparatus as claimed in claim 10 wherein labyrinth radiation seal comprises a plurality of concentric cylindrical cavities formed by intermeshing cylindrical flanges.

14. An apparatus as claimed in claim 8 wherein said waveguide system includes a mode transducer to change the mode of propagation of said microwave radiation from the $TE_{10}$ to TEM mode.

15. An apparatus as claimed in claim 14 wherein said waveguide system includes a section of slowly tapering co-axial line interposed between said mode transducer and said transition waveguide section to act as a mode filter.

16. A method for centrifugal casting of hollow articles, comprising the steps of:
placing a casting composition in a rotating mold having a longitudinally extending cavity and a substantially microwave impervious outer wall; and
directing transverse electric and magnetic (TEM) microwave radiation into said rotating mold using a center conductor which extends axially along said mold and forms a coaxial structure consisting of said center conductor and said mold such that said microwave radiation propagates along said longitudinally extending cavity to heat from within said mold the casting composition disposed therein while said mold is rotating.

17. A method as claimed in claim 16 further comprising the step of establishing standing waves of microwave radiation within said mould.

18. An apparatus for centrifugal casting of hollow articles, comprising:
a hollow elongated rotatable mold, having an interior cavity, at least one substantially open end, and a substantially microwave impervious outer wall;
means for generating microwave radiation; and
transmission means coupled to said means for generating microwave radiation, and further including a transition waveguide section coupled to said open end by a non-contacting rotary joint, for directing said microwave radiation into said mold while the mold is rotating such that said microwave radiation propagates along said interior cavity to heat a casting material disposed therein.

19. A method for centrifugal casting of hollow articles, comprising the steps of:
placing a casting composition in a hollow, elongated rotating mold having an interior cavity, at least one substantially open end, and a substantially microwave impervious outer wall; and
directing microwave radiation through a transition waveguide section coupled to said open end by an on-contacting rotary joint into said rotating mold such that said microwave radiation propagates along said interior cavity to heat the casting composition disposed therein while said mold is rotating.

* * * * *

UNITED STATES PATENT AND TRADEMARK OFFICE
CERTIFICATE OF CORRECTION

PATENT NO. : 5,222,543
DATED : June 29, 1993
INVENTOR(S) : Bengt I. Carlstrom, et al It is certified that error appears in the above-identified patent and that said Letters Patent is hereby corrected as shown below:

On Page 1, in identification line [75], "Klagenfurt;" should read --Klagenfurt; Austria--; and on the last line, "Epping, all of Austria" should read --Epping, all of Australia--.

Column 1, line 20, "wit" should read --with--.

Column 2, line 19, "the can" should read --they can--.

Column 2, line 22, "mould" should read --moulding--.

Column 2, line 38, "method." should read --methods.--.

Column 3, line 57, "coupled to the waveguide" should read --couple the waveguide--.

Column 3, line 65-66, "transitionally" should read --transitional--.

Column 4, line 2, "double-choked" should read --doubly-choked--.

Column 4, line 26, "double-choked" should read --doubly-choked--.

Column 4, line 65-66, "double-choked" should read --doubly-choked--.

UNITED STATES PATENT AND TRADEMARK OFFICE
CERTIFICATE OF CORRECTION

PATENT NO. : 5,222,543

DATED : June 29, 1993

INVENTOR(S) : Bengt I. Carlstrom, et al

It is certified that error appears in the above-identified patent and that said Letters Patent is hereby corrected as shown below:

Column 4, line 68, "coupled" should read --coupling--.

Column 5, line 2, "the flange 20" should read --the flange 30--.

Column 5, line 68, "tap 45" should read --gap 45--.

Column 6, line 31, "A double-" should read --A doubly- --.

Column 6, line 45, "circuit 25 i concentric" should read --circuit 25 is concentric--.

Column 7, line 3, "FIG. 5ashowing" should read --FIG. 5a showing--.

Column 7, line 4, "sort circuit" should read --short circuit--.

Column 7, line 20, "rotation" should read --rotating--.

Column 7, line 25, "double-choked" should read --doubly-choked--.

Column 7, line 27, "rotary joints are established. The" should read --rotating and non-rotating--.

Column 7, line 28, "double-choked" should read --doubly-choked--.

UNITED STATES PATENT AND TRADEMARK OFFICE
CERTIFICATE OF CORRECTION

PATENT NO. : 5,222,543
DATED : June 29, 1993
INVENTOR(S) : Bengt I. Carlstrom, et al It is certified that error appears in the above-identified patent and that said Letters Patent is hereby corrected as shown below:

Column 7, line 40, "bee" should read --been--.

Column 7, line 42, "sued" should read --used--.

Column 8, line 58, "form within" should read --from within--.

Column 9, line 31, "double-choked" should read --doubly-choked--.

Column 9, line 10, "coupled" should read --coupling--.

Column 10, line 42-43, "by an on-contacting" should read --by a non-contacting--.

Signed and Sealed this

Twenty-first Day of June, 1994

Attest:

BRUCE LEHMAN

Attesting Officer       Commissioner of Patents and Trademarks